(12) United States Patent
Yano

(10) Patent No.: US 9,976,600 B2
(45) Date of Patent: May 22, 2018

(54) METHOD OF PRODUCING WHEEL BEARING APPARATUS

(71) Applicant: JTEKT CORPORATION, Osaka-shi, Osaka (JP)

(72) Inventor: Hiroshi Yano, Okazaki (JP)

(73) Assignee: JTEKT CORPORATION, Osaka-shi (JP)

( * ) Notice: Subject to any disclaimer, the term of this patent is extended or adjusted under 35 U.S.C. 154(b) by 141 days.

(21) Appl. No.: 15/085,511

(22) Filed: Mar. 30, 2016

(65) Prior Publication Data

US 2016/0290406 A1    Oct. 6, 2016

(30) Foreign Application Priority Data

Apr. 2, 2015    (JP) ................. 2015-075971

(51) Int. Cl.
*F16C 43/04* (2006.01)
*B60B 27/00* (2006.01)
*F16C 33/78* (2006.01)
*F16C 19/38* (2006.01)

(52) U.S. Cl.
CPC .......... *F16C 43/045* (2013.01); *B60B 27/001* (2013.01); *B60B 27/0073* (2013.01); *F16C 33/7876* (2013.01); *B60B 27/0094* (2013.01); *B60B 2310/316* (2013.01); *B60B 2320/10* (2013.01); *B60B 2380/14* (2013.01); *B60B 2380/73* (2013.01); *B60B 2900/511* (2013.01); *F16C 19/386* (2013.01)

(58) Field of Classification Search
CPC ............ B60B 27/0015; B60B 27/0073; B60B 27/0094; B60B 2900/511; B60B 2900/5118; F16C 33/7879
See application file for complete search history.

(56) References Cited

U.S. PATENT DOCUMENTS

| 2007/0193032 A1* | 8/2007 | Takimoto | .............. B60B 27/001 29/898 |
| 2009/0052823 A1* | 2/2009 | Komori | ............... B60B 27/0005 384/454 |

FOREIGN PATENT DOCUMENTS

JP    2013-217419 A    10/2013

* cited by examiner

*Primary Examiner* — Jason L Vaughan
*Assistant Examiner* — Amanda Meneghini
(74) *Attorney, Agent, or Firm* — Oliff PLC

(57) ABSTRACT

A method of producing a wheel bearing apparatus includes: performing positioning of a slinger of a sealing device with respect to a base shaft portion of a hub spindle by pressing a jig to press-fit the slinger to the base shaft portion, using an inner ring contacted surface, which is a step portion between a small-diameter shaft portion and a large-diameter shaft portion of the hub spindle, as a reference surface; and fitting, after the slinger is press-fitted to the base shaft portion, an inner ring to the small-diameter shaft portion such that the inner ring reaches a position at which the inner ring comes into contact with the inner ring contacted surface, in a state where an outer ring, rolling elements, and the sealing device have been assembled to the hub spindle.

4 Claims, 8 Drawing Sheets

METHOD OF PRODUCING WHEEL BEARING APPARATUS

INCORPORATION BY REFERENCE

The disclosure of Japanese Patent Application No. 2015-075971 filed on Apr. 2, 2015 including the specification, drawings and abstract is incorporated herein by reference in its entirety.

BACKGROUND OF THE INVENTION

1. Field of the Invention

The invention relates to a method of producing a wheel bearing apparatus.

2. Description of Related Art

FIG. 8 illustrates a wheel bearing apparatus 500 described in Japanese Patent Application Publication No. 2013-217419 (JP 2013-217419 A). The wheel bearing apparatus 500 includes a hub spindle 520, and an outer ring 510 disposed radially outward of the hub spindle 520. The hub spindle 520 has a flange 522. The flange 522 is formed at an outboard-side end portion of the hub spindle 520 in the vehicle-width direction. A wheel (not illustrated) is attached to the flange 522. The outer ring 510 is fixed to a vehicle fixed member. The hub spindle 520 is supported such that rolling elements 530 allow the hub spindle 520 to rotate relative to the outer ring 510.

In the wheel bearing apparatus 500, entry of foreign matter (e.g. rain water or muddy water splashed from a road surface) into a space between the hub spindle 520 and the outer ring 510 is desired to be prevented. In view of this, the space between the hub spindle 520 and the outer ring 510 is sealed at both ends. On the outboard side of the space in the vehicle-width direction, a sealing device 540 is disposed between a root portion of the flange 522 of the hub spindle 520 and the outer ring 510, and the sealing device 540 is assembled to the root portion of the flange 522 of the hub spindle 520 and the outer ring 510, as illustrated in FIG. 8. The sealing device 540 includes a sealing member 560, and a slinger 550 disposed adjacent to the sealing member 560. The sealing member 560 includes a core 570 and a seal body 580. The core 570 has a tubular portion 570a press-fitted to the inner peripheral surface of the outer ring 510, and an annular portion 570b projecting radially inward from the tubular portion 570a. The seal body 580 is attached integrally to the annular portion 570b. The seal body 580 is formed of an elastic body.

The slinger 550 has a slinger tubular portion 550a press-fitted to the hub spindle 520, and a slinger annular portion 550b projecting radially outward from the slinger tubular portion 550a. A seal lip 580a that is a distal end of the seal body 580 is slidably in contact with the slinger annular portion 550b. With the contact between the seal lip 580a and the slinger annular portion 550b, the space between the hub spindle 520 and the outer ring 510 is sealed off from a space on the outboard side in the vehicle-width direction. The slinger 550 is made of stainless steel, and thus does not readily rust. Thus, the seal lip 580a in contact with the slinger annular portion 550b is prevented from coming into contact with rust. As a result, abrasion of the seal lip 580a, which would occur due to contact with rust, is prevented.

For example, the seal lip 580a may be brought into contact with the flange 522 to seal off the space between the hub spindle 520 and the outer ring 510. In this case, when the flange 522 gets rusty due to the water thrown up by the wheel (not illustrated), the seal lip 580a comes into contact with the rust, leading to abrasion of the seal lip 580a. However, in the technique described in JP 2013-217419 A, provision of the slinger 550 prevents abrasion of the seal lip 580a, which would occur due to contact with rust, thereby preventing a decrease in the sealing performance.

In the technique described in JP 2013-217419 A (see FIG. 8), if the distance between the seal body 580 and the slinger 550 is excessively short, the contact pressure applied from the seal lip 580a to the slinger annular portion 550b becomes excessively high, and thus the torque applied to the wheel bearing apparatus 500 becomes excessively high. On the other hand, when the distance between the seal body 580 and the slinger 550 is excessively long, the contact pressure applied from the seal lip 580a to the slinger annular portion 550b becomes excessively low, and thus desired sealing performance cannot be achieved. It is to be noted that, JP 2013-217419 A does not describe any method of performing the positioning of the slinger 550. Therefore, the inventor has found room for improvement in the positioning accuracy of a slinger in this type of wheel bearing apparatus.

SUMMARY OF THE INVENTION

The invention makes it possible to achieve improved positioning accuracy of a slinger of a sealing device disposed on the outboard side in a wheel bearing apparatus, when the slinger is assembled to a hub spindle of the wheel bearing apparatus.

An aspect of the invention relates to a method of producing a wheel bearing apparatus. The wheel bearing apparatus includes a hub spindle, an inner ring, an outer ring, double row rolling elements, and a sealing device. The hub spindle includes a flange to which a wheel is attached. The flange is at an outboard-side end portion of the hub spindle in the vehicle-width direction. The hub spindle includes a base shaft portion located at a root of the flange, a large-diameter shaft portion, and a small-diameter shaft portion. The base shaft portion, the large-diameter shaft portion, and the small-diameter shaft portion are arranged in this order in a stepwise manner from the flange toward the inboard side in the vehicle-width direction. An inner ring is fitted to the small-diameter shaft portion. The inner ring is brought into contact with an inner ring contacted surface that is a step portion between the small-diameter shaft portion and the large-diameter shaft portion. An outer ring is disposed radially outward of the large-diameter shaft portion and the inner ring so as to be concentric with the large-diameter shaft portion and the inner ring. The double-row rolling elements are rollably disposed between the large-diameter shaft portion and the inner ring, and the outer ring. The sealing device includes a slinger. The sealing device is disposed between the base shaft portion and the outer ring. The sealing device is assembled to the base shaft portion and the outer ring. The method includes: performing positioning of the slinger with respect to the base shaft portion by pressing a jig to press-fit the slinger to the base shaft portion, using the inner ring contacted surface as a reference surface; and fitting, after the slinger is press-fitted to the base shaft portion, the inner ring to the small-diameter shaft portion such that the inner ring reaches a position at which the inner ring comes into contact with the inner ring contacted surface, in a state where the outer ring, the rolling elements, and the sealing device have been assembled to the hub spindle.

According to the above aspect of the invention, it is possible to achieve improved positioning accuracy of the slinger of the sealing device disposed on the outboard side in the wheel bearing apparatus, when the slinger is assembled to the hub spindle of the wheel bearing apparatus.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
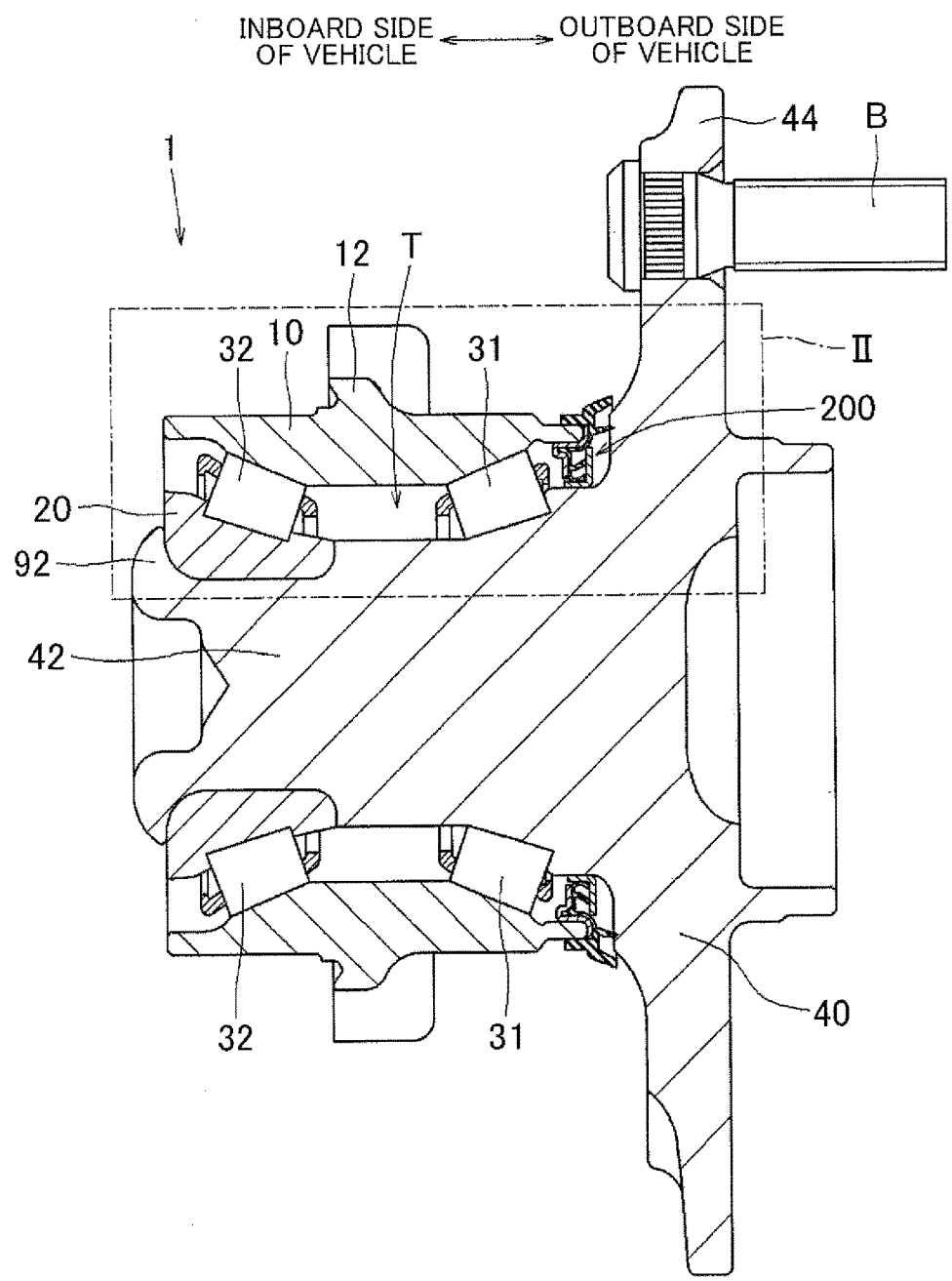
FIG. 1 is a sectional view of a wheel bearing apparatus.

Hereinafter, an embodiment of the invention will be described with reference to the accompanying drawings. In this specification, "inboard side" means the side closer to the center line of a vehicle in the vehicle-width direction, and "outboard side" means the side farther from the center line of the vehicle in the vehicle-width direction. Note that, "inboard side" and "outboard side", will be used to describe the relative positional relationship between two or more elements in the vehicle-width direction. A wheel bearing apparatus 1 illustrated in FIG. 1 and FIG. 2 has a double-row tapered roller bearing structure. The wheel bearing apparatus 1 includes an outer ring 10, a hub spindle 40, an inner ring 20, tapered rollers 31, 32 that are rolling elements, and a sealing device 200.

The outer ring 10 has a flange 12. The flange 12 is fixed to a vehicle fixed member (e.g. knuckle) (not illustrated). The inner peripheral surface of the outer ring 10 has an outboard-side outer ring raceway surface 14 and an inboard-side outer ring raceway surface 16.

The hub spindle 40 has a shaft portion 42, and a flange 44 formed at an outboard-side end portion of the shaft portion 42. The shaft portion 42 is disposed radially inward of the outer ring 10 so as to be concentric with the outer ring 10. An annular space T that is a continuous space in the circumferential direction is defined between the shaft portion 42 and the outer ring 10. The flange 44 is disposed outside the outer ring 10, at a position on the outboard side with respect to the outer ring 10. The wheel (not illustrated) is fixed to the flange 44 with a bolt B.

The shaft portion 42 has a base shaft portion 50, a large-diameter shaft portion 70, and a small-diameter shaft portion 90 arranged in this order from the outboard side toward the inboard side. The base shaft portion 50, the large-diameter shaft portion 70, and the small-diameter shaft portion 90 are formed in a stepwise manner such that the diameter of the shaft portion 42 decreases stepwise from the outboard side toward the inboard side.

The base shaft portion 50 is continuous with an inboard-side root of the flange 44. The base shaft portion 50 is larger in diameter than the large-diameter shaft portion 70. The base shaft portion 50 faces an outboard-side end portion 18 of the outer ring 10. A slinger 210 (described later in detail) is press-fitted to the base shaft portion 50.

An outboard-side portion of the large-diameter shaft portion 70 faces the outboard-side outer ring raceway surface 14 of the outer ring 10. The large-diameter shaft portion 70 has an outboard-side inner ring raceway surface 72 that corresponds to the outboard-side outer ring raceway surface 14 of the outer ring 10. A plurality of the outboard-side tapered rollers 31 (tapered rollers 31 disposed in an outboard-side row) is rollably disposed between the outboard-side inner ring raceway surface 72 and the outboard-side outer ring raceway surface 14. The tapered rollers 31 are arranged at regular intervals in the circumferential direction. A step portion between the base shaft portion 50 and the large-diameter shaft portion 70 serves as a rib portion 60 of the outboard-side inner ring raceway surface 72, thereby supporting roller end faces of the tapered rollers 31.

The small-diameter shaft portion 90 is located at a position corresponding to the inboard-side outer ring raceway surface 16 of the outer ring 10. The inner ring 20 is fitted to the small-diameter shaft portion 90. A distal end portion of the small-diameter shaft portion 90 is a clinched portion 92 that holds the inner ring 20. A step portion between the small-diameter shaft portion 90 and the large-diameter shaft portion 70 serves as an inner ring contacted surface 80 with which the contact surface 22 of the inner ring 20 is brought into contact.

The outer peripheral surface of the inner ring 20 has an inboard-side inner ring raceway surface 24. A plurality of the inboard-side tapered rollers 32 (tapered rollers 32 disposed in an inboard-side row) is rollably disposed between the inboard-side inner ring raceway surface 24 and the inboard-side outer ring raceway surface 16. The tapered rollers 32 are arranged at regular intervals in the circumferential direction.

The sealing device 200 includes the slinger 210 and a sealing member 220. The slinger 210 is made of for example, stainless steel. The slinger 210 has a slinger tubular portion 210a press-fitted to the base shaft portion 50, and a slinger annular portion 210b projecting radially outward from the slinger tubular portion 210a. The slinger 210 is disposed between the outboard-side end portion 18 of the outer ring 10 and the base shaft portion 50 of the hub spindle 40.

The sealing member 220 includes a core 230 made of metal, and a seal body 240 formed of an elastic body (e.g. rubber). The core 230 has a core tubular portion 230a press-fitted to the inner peripheral surface of the outboard-side end portion 18 of the outer ring 10, and a core annular portion 230b projecting radially inward from the metal core tubular portion 230a. The seal body 240 is bonded integrally to the core 230 from the outboard side. The seal body 240 has a plurality of seal lips 240a extending from the metal core annular portion 230b toward the outboard side. The seal lips 240a are slidably in contact with the slinger annular portion 210b. With the contact between the seal lips 240a and the slinger annular portion 210b, a part of the annular space T between the outboard-side end portion 18 of the outer ring 10 and the base shaft portion 50 of the hub spindle 40 is sealed off. The slinger 210 and the seal body 240 are located at such appropriate positions that the contact pressure applied from the seal lips 240a to the slinger annular portion 210b is neither excessively high nor excessively low. Thus, the sealing device 200 achieves the desired sealing performance.

Figure 3:
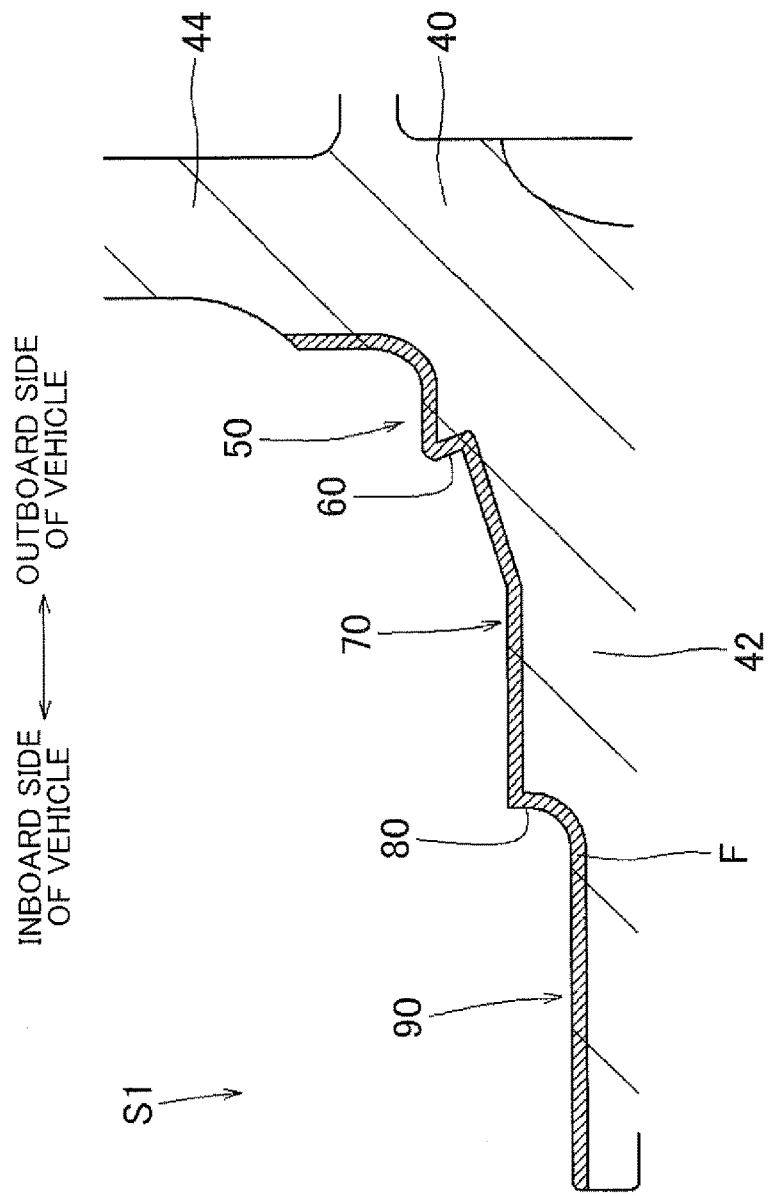
FIG. 3 is a sectional view of a region corresponding to FIG. 2, for illustrating a hub spindle grinding step.

Next, a method of producing the wheel bearing apparatus 1 will be described. The components of the wheel bearing apparatus 1 are sequentially provided from the component on the most outboard side, to assemble the wheel bearing apparatus 1. First, in a hub spindle grinding step S1 (see FIG. 3), a grinding process is continuously performed on the small-diameter shaft portion 90, the inner ring contacted surface 80, the large-diameter shaft portion 70, the rib portion 60, the base shaft portion 50, and the base end portion of the flange 44 of the hub spindle 40. In FIG. 3, a ground region F that has been subjected to the grinding process is hatched.

Figure 7:
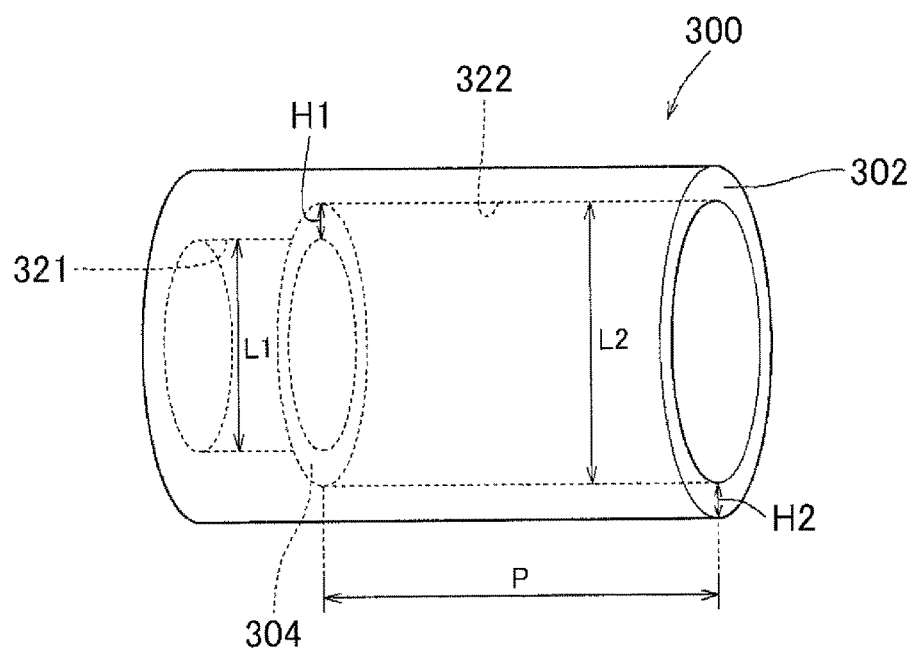
FIG. 7 is a perspective view of a jig.
Figure 8:
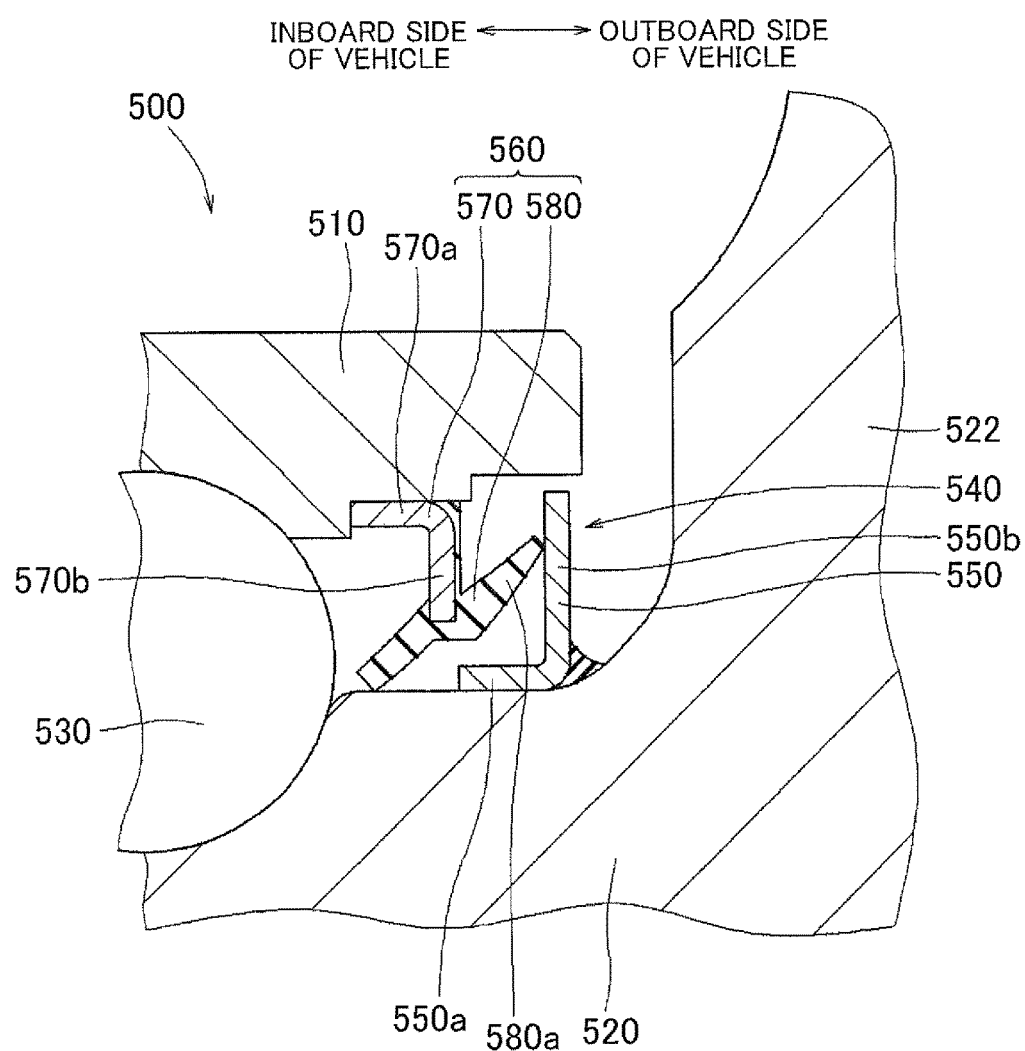
FIG. 8 is a sectional view illustrating a part of a wheel bearing apparatus according to related art.

Then, a slinger press-fitting step S2 (see FIG. 4) is performed. In the slinger press-fitting step S2, the slinger 210 is press-fitted to the base shaft portion 50 of the hub spindle 40. A jig 300 illustrated in FIG. 7 is used to press-fit the slinger 210 to the base shaft portion 50. The jig 300 has a cylindrical shape. The inner diameter of the jig 300 varies between a first end and a second end of the jig 300. A first diameter L that is the diameter of a first inner peripheral surface 321 is greater than the diameter of the small-diameter shaft portion 90 of the hub spindle 40 (see FIG. 4) and less than the diameter of the large-diameter shaft portion 70. A second diameter L2 that is the diameter of a second inner peripheral surface 322 is greater than the diameter of the base shaft portion 50 of the hub spindle 40 (see FIG. 4). The second diameter L2 is greater than the diameter of the slinger tubular portion 210a of the slinger 210 (see FIG. 4) and less than the diameter of a distal edge C of the slinger annular portion 210b.

As illustrated in FIG. 7, a pressing restriction surface 304 having an annular shape is defined between the first inner peripheral surface 321 and the second inner peripheral surface 322. The pressing restriction surface 304 is a step portion between the first inner peripheral surface 321 and the second inner peripheral surface 322. The pressing restriction surface 304 is a smooth surface extending along a plane that is perpendicular to the axis of the jig 300. The pressing restriction surface 304 has a prescribed width H1 that is equal to half the difference between the inner diameter and the outer diameter of the pressing restriction surface 304. The inner diameter of the pressing restriction surface 304 is equal to the first diameter L1. The outer diameter of the pressing restriction surface 304 is equal to the second diameter L2. The pressing restriction surface 304 can be brought into surface contact, over its entire circumference, with the inner ring contacted surface 80 of the hub spindle 40 (see FIG. 4).

An end surface of the jig 300, the end surface being on the second inner peripheral surface 322 side, constitutes a slinger pressing surface 302 (see FIG. 7). The slinger pressing surface 302 is a smooth surface extending along a plane that is perpendicular to the axis of the jig 300. The slinger pressing surface 302 has a prescribed width H2 that is equal to half the difference between the inner diameter and the outer diameter of the slinger pressing surface 302. The inner diameter of the slinger pressing surface 302 is equal to the second diameter L2. The outer diameter of the slinger pressing surface 302 is equal to the diameter of the outer peripheral surface of the jig 300. For example, the outer diameter of the slinger pressing surface 302 is greater than the diameter of the distal edge C of the slinger annular portion 210b (see FIG. 4). Alternatively, the outer diameter of the slinger pressing surface 302 may be less than the diameter of the distal edge C of the slinger annular portion 210b. The slinger pressing surface 302 can be brought into surface contact, over its entire circumference, with the slinger annular portion 210b.

In the axial direction of the jig 300 (see FIG. 4 and FIG. 7), a positioning dimension P that is the distance between the pressing restriction surface 304 and the slinger pressing surface 302 is longer than the length of the large-diameter shaft portion 70 of the hub spindle 40 in its axial direction. In addition, the positioning dimension P is shorter than the sum of the length of the large-diameter shaft portion 70 and the length of the base shaft portion 50 in the axial direction of the hub spindle 40. The positioning dimension P will be described in more detail. The positioning dimension P is set to such a dimension that the slinger pressing surface 302 is located at an appropriate position on the base shaft portion 50 when the pressing restriction surface 304 is located on the inner ring contacted surface 80 of the hub spindle 40. The appropriate position will be described below. When the slinger annular portion 210b of the slinger 210 is disposed at the appropriate position, the contact pressure applied from the seal lips 240a of the seal body 240 (see FIG. 5), which will be provided later, is neither excessively high nor excessively low.

Figure 4:
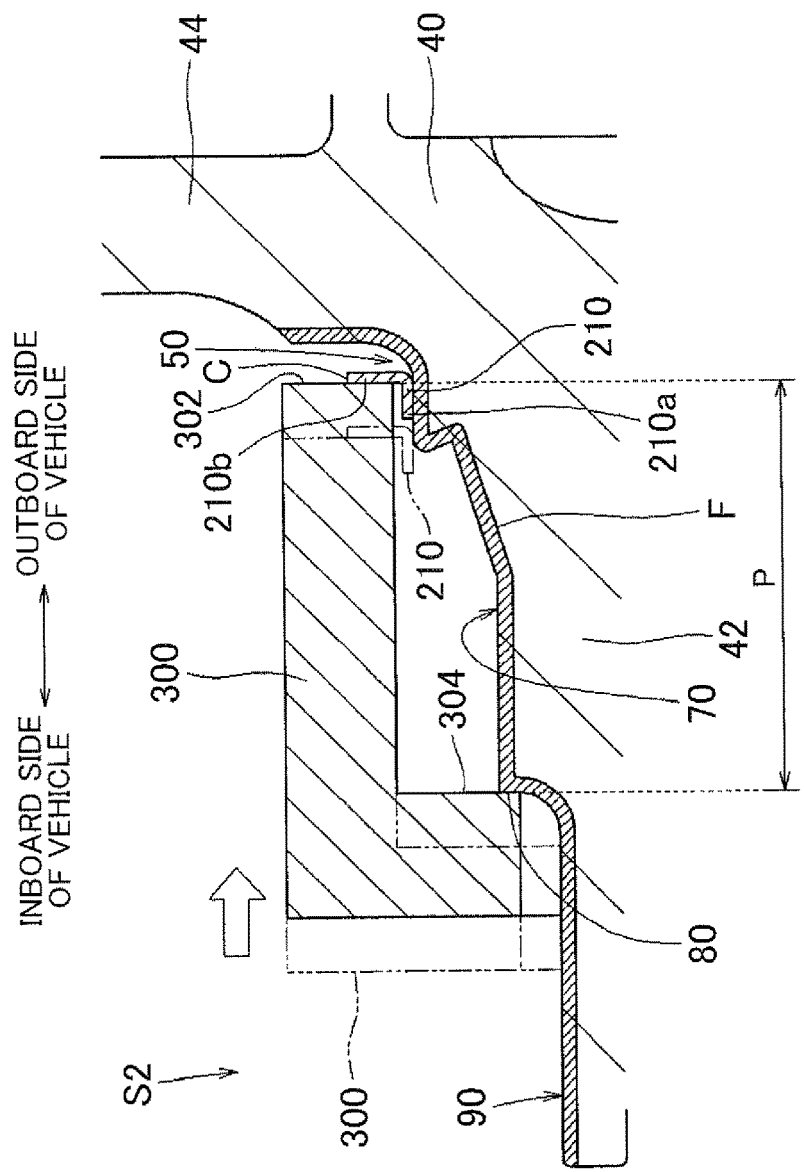
FIG. 4 is a sectional view of a region corresponding to FIG. 2, for illustrating a slinger press-fitting step.
Figure 5:
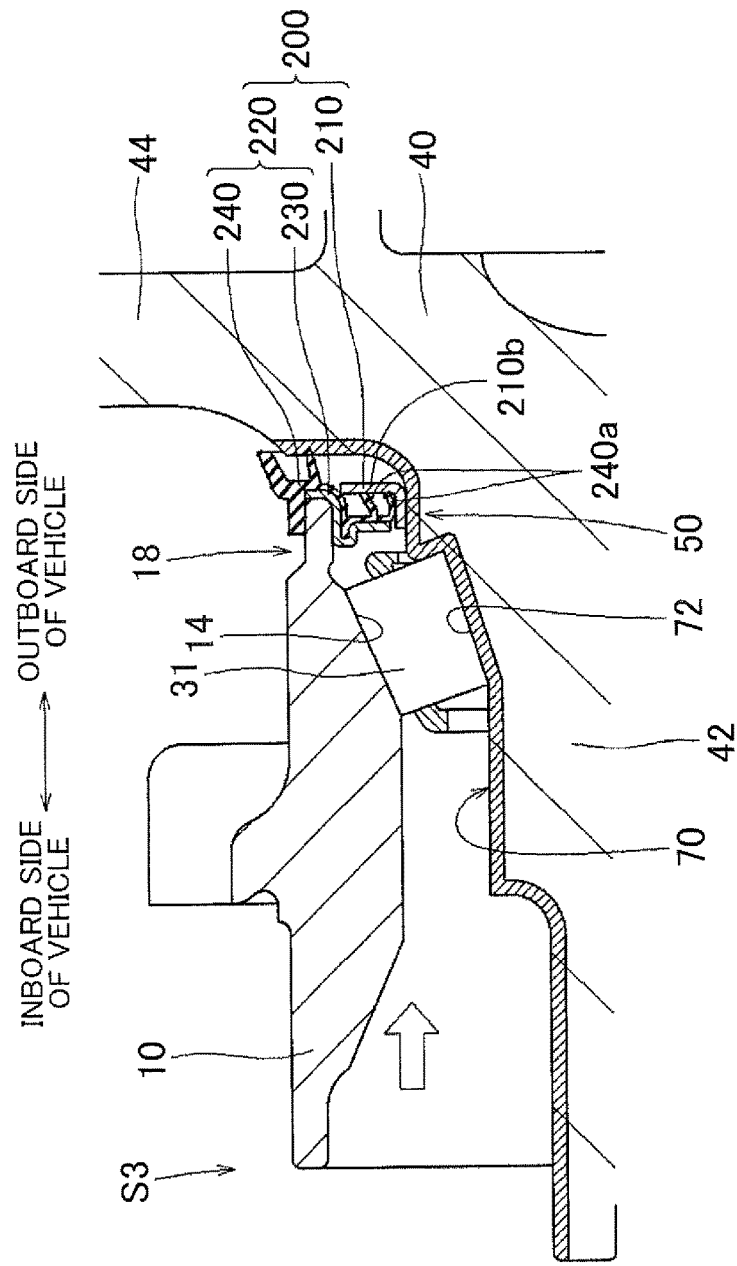
FIG. 5 is a sectional view of a region corresponding to FIG. 2, for illustrating an outer ring assembling step.

As illustrated in FIG. 4, the slinger 210 is press-fitted to the base shaft portion 50 of the hub spindle 40 by the jig 300. Specifically, the jig 300 is pressed toward the outboard side while the slinger pressing surface 302 of the jig 300 is in contact with the slinger annular portion 210b. The jig 300 is pressed to such a position (indicated by a continuous line in FIG. 4) that the pressing restriction surface 304 comes into contact with the inner ring contacted surface 80 of the hub spindle 40. The position of the slinger pressing surface 302 at the time when the pressing restriction surface 304 comes into contact with the inner ring contacted surface 80, is defined as the mounting position of the slinger 210. In this way, the positioning of the slinger 210 with respect to the base shaft portion 50 is performed using the inner ring contacted surface 80 of the hub spindle 40 as a reference surface, and then the slinger 210 is attached to the base shaft portion 50.

After the slinger press-fitting step S2, an outer ring assembling step S3 (see FIG. 5) is performed. In the outer ring assembling step S3, together with the outboard-side tapered rollers 31, the outer ring 10 is assembled to the shaft portion 42 of the hub spindle 40. Note that, the sealing member 220 of the sealing device 200 is provided in advance on the outer ring 10 before the outer ring 10 is assembled to the hub spindle 40. When the outer ring 10 is assembled to the hub spindle 40, the sealing device 200 is disposed between the outboard-side end portion 18 of the outer ring 10 and the base shaft portion 50 of the hub spindle 40 and the sealing device 200 is assembled to the outboard-side end portion 18 of the outer ring 10 and the base shaft portion 50 of the hub spindle 40.

Figure 2:
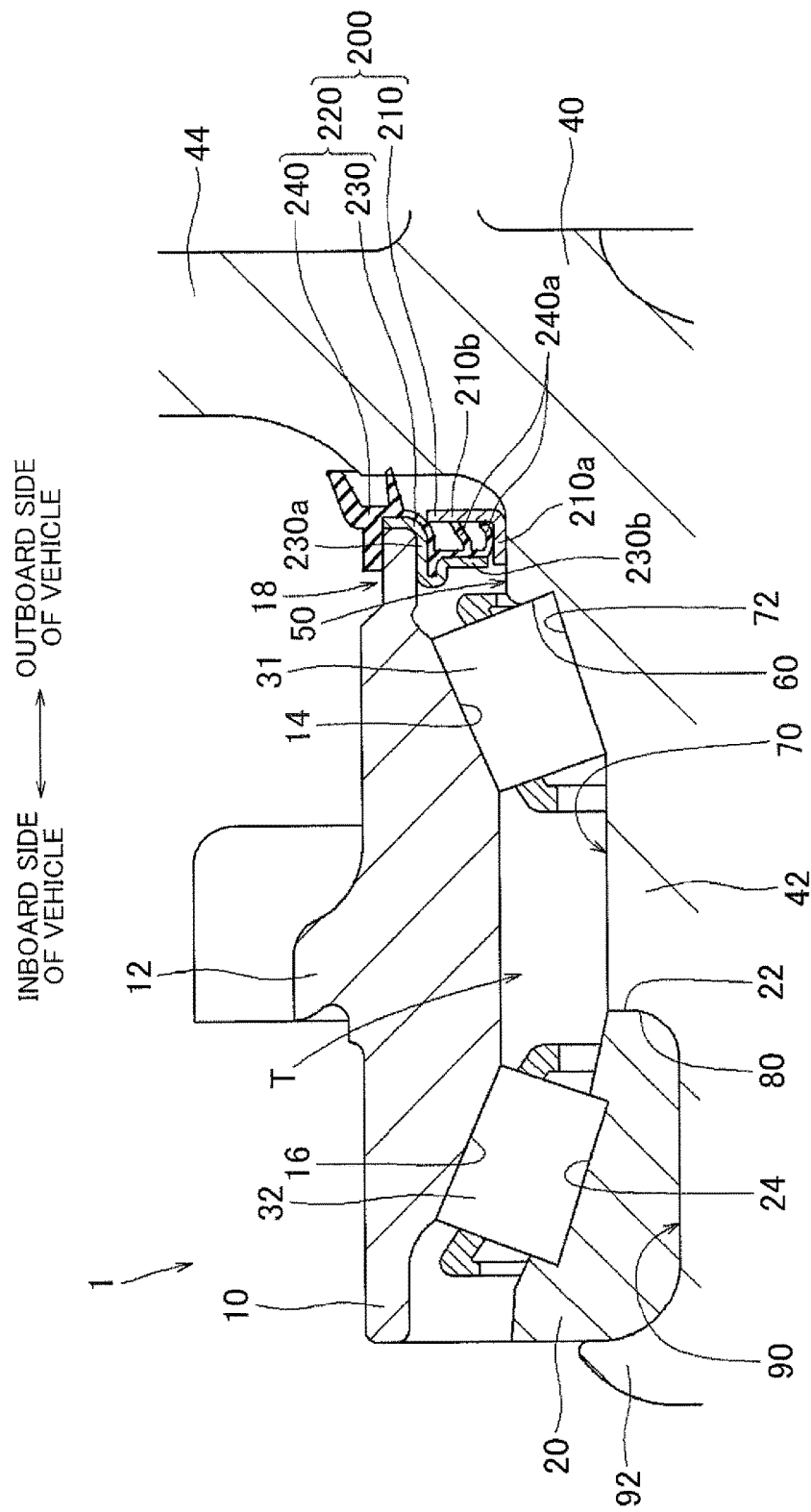
FIG. 2 is an enlarged sectional view of a region II in FIG. 1.
Figure 6:
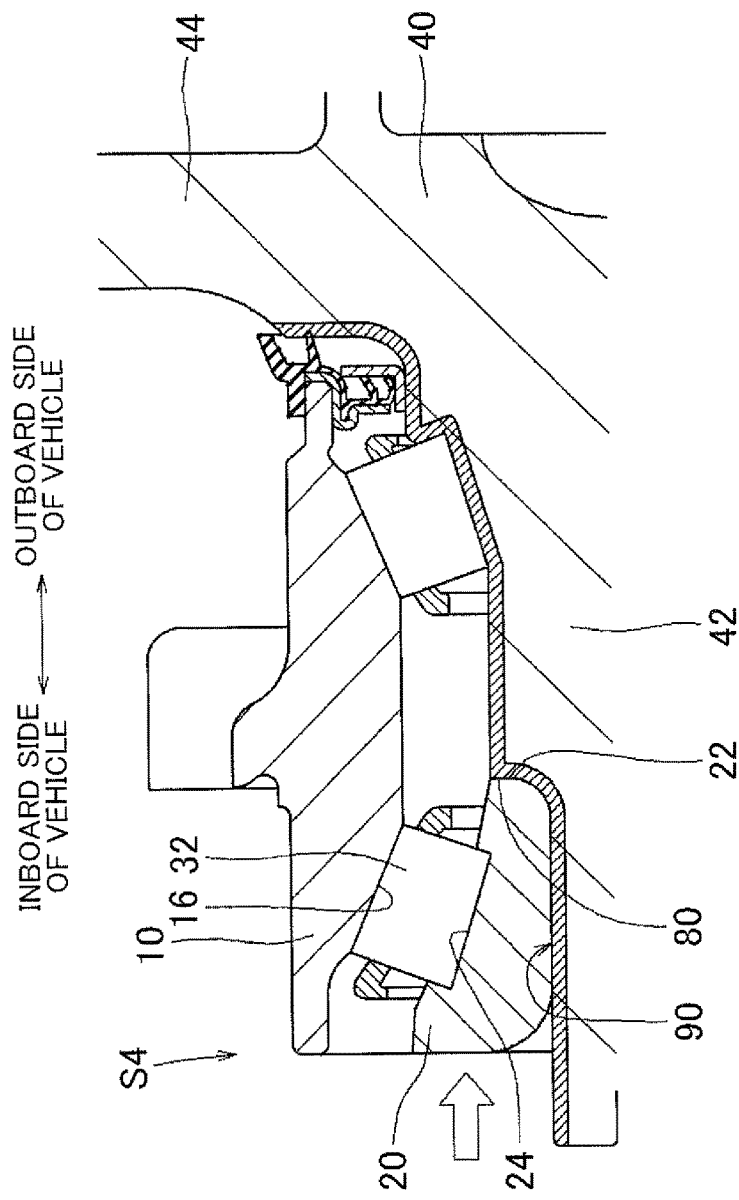
FIG. 6 is a sectional view of a region corresponding to FIG. 2, for illustrating an inner ring fitting step.

After the outer ring assembling step S3, an inner ring fitting step S4 (see FIG. 6) is performed. In the inner ring fitting step S4, together with the inboard-side tapered rollers 32, the inner ring 20 is fitted to the small-diameter shaft portion 90 of the hub spindle 40. The inner ring 20 is fitted to the small-diameter shaft portion 90 such that the inner ring 20 reaches a position at which the contact surface 22 of the inner ring 20 comes into contact with the inner ring contacted surface 80 of the hub spindle 40. Then, in a clinching step (not illustrated), the distal end portion of the small-diameter shaft portion 90 is clinched so as to hold the inner ring 20. As a result, the clinched portion 92 illustrated in FIG. 2 is formed. The clinched portion 92 prevents the inner ring 20 from being detached from the hub spindle 40 toward the inboard side.

In the foregoing producing method, the reference surface is set, and the reference surface is used for performing the positioning of the slinger 210 when the slinger 210 is assembled to the base shaft portion 50 of the hub spindle 40. Thus, the slinger 210 is located at a prescribed position at a prescribed distance corresponding to the positioning dimension P of the jig 300, from the reference surface. As a result, the slinger 210 is reliably located at the prescribed position, leading to an improvement in the positioning accuracy of the slinger 210. The positioning dimension P is set to the appropriate dimension described above. Thus, the slinger 210 is located at the appropriate position at which the contact pressure applied from the seal lips 240a to the slinger annular portion 210b is neither excessively high nor excessively low.

In the step prior to the positioning of the slinger 210, the outer peripheral surface of the hub spindle 40 from the small-diameter shaft portion 90 to the base end portion of the flange 44 is continuously ground. Thus, in a region of the hub spindle 40 from the small-diameter shaft portion 90 to the flange 44, product-to-product variations in the surface machining accuracy are reduced. In the foregoing producing method, the inner ring contacted surface 80 with reduced variations in the surface machining accuracy is used as the reference surface for the positioning of the slinger 210. Thus, it is possible to reduce variations in the positioning location of the slinger 210, which would occur due to variations in the machining accuracy of the reference surface. As a result, the positioning accuracy of the slinger 210 improves.

While one example embodiment of the invention has been described above, the method of producing a wheel bearing apparatus according to the invention should not be limited to the foregoing embodiment, and may be implemented in various other embodiments. For example, in the forgoing embodiment, the tapered rollers 31, 32 are employed as rolling elements. Alternatively, balls may be employed as rolling elements.

What is claimed is:

1. A method of producing a wheel bearing apparatus, the wheel bearing apparatus including:
   a hub spindle including a flange to which a wheel is attached, the flange being at an outboard-side end portion of the hub spindle in a vehicle-width direction, the hub spindle including a base shaft portion located at a root of the flange, a large-diameter shaft portion, and a small-diameter shaft portion, and the base shaft portion, the large-diameter shaft portion, and the small-diameter shaft portion being arranged in this order in a stepwise manner from the flange toward an inboard side in the vehicle-width direction;
   an inner ring fitted to the small-diameter shaft portion, the inner ring being brought into contact with an inner ring contacted surface that is a step portion between the small-diameter shaft portion and the large-diameter shaft portion;
   an outer ring disposed radially outward of the large-diameter shaft portion and the inner ring so as to be concentric with the large-diameter shaft portion and the inner ring;
   double-row rolling elements rollably disposed between the large-diameter shaft portion and the inner ring, and the outer ring; and
   a sealing device including a slinger that is press-fitted on an outer peripheral surface of the base shaft portion and a sealing member that is press-fitted on an inner peripheral surface of the outer ring, the sealing device being disposed between the base shaft portion and the outer ring, and the sealing device being assembled to the base shaft portion and the outer ring,
   the method comprising:
   performing positioning of the slinger on the outer peripheral surface of the base shaft portion by pressing a jig to press-fit the slinger to the base shaft portion, using the inner ring contacted surface as a reference surface; and
   fitting, after the slinger is press-fitted on the outer peripheral surface of the base shaft portion, the inner ring to the small-diameter shaft portion such that the inner ring reaches a position at which the inner ring comes into contact with the inner ring contacted surface, in a state where the outer ring, the rolling elements, and the sealing device have been assembled to the hub spindle.

2. The method according to claim 1, wherein a grinding process is continuously performed on an outer peripheral surface of the hub spindle from the small-diameter shaft portion to the base shaft portion.

3. The method according to claim 1, wherein:
   the double row rolling elements are rolling elements disposed in an inboard-side row in the vehicle-width direction and rolling elements disposed in an outboard-side row in the vehicle-width direction; and
   after the slinger is press-fitted on the outer peripheral surface of the base shaft portion, the inner ring, together with the rolling elements disposed in the inboard-side row, is fitted to the small-diameter shaft portion such that the inner ring reaches the position at which the inner ring comes into contact with the inner ring contacted surface, in a state where the outer ring, the rolling elements disposed in the outboard-side row, and the sealing device have been assembled to the hub spindle.

4. The method according to claim 1, wherein, after the inner ring is fitted to the small-diameter shaft portion, a distal end portion of the small-diameter shaft portion is clinched so as to hold the inner ring.

* * * * *